United States Patent
Saiki

[19]

[11] Patent Number: 6,158,279
[45] Date of Patent: Dec. 12, 2000

[54] SPEEDOMETER MOUNTING DEVICE FOR A VEHICLE

[75] Inventor: Terunari Saiki, Saitama, Japan

[73] Assignee: Honda Giken Kogyo Kabushiki Kaisha, Tokyo, Japan

[21] Appl. No.: 09/240,011

[22] Filed: Jan. 29, 1999

[30] Foreign Application Priority Data

Jan. 30, 1998 [JP] Japan ................................ 10-019438

[51] Int. Cl.7 ........................................................ G01P 3/50
[52] U.S. Cl. ............................ 73/493; 324/166; 362/476
[58] Field of Search ..................... 73/493, 490; 324/166; 362/475, 476

[56] References Cited

U.S. PATENT DOCUMENTS

| | | | |
|---|---|---|---|
| 2,542,926 | 2/1951 | Jozif et al. ............................... | 362/475 |
| 4,974,124 | 11/1990 | Wu ........................................... | 362/475 |
| 5,696,704 | 12/1997 | Semrau .................................... | 324/166 |

FOREIGN PATENT DOCUMENTS

49-119953  10/1974  Japan.

*Primary Examiner*—John E. Chapman
*Attorney, Agent, or Firm*—Birch, Stewart, Kolasch & Birch, LLP

[57] ABSTRACT

In a headlight integral with a speedometer the rigidity of the headlight case is ensured while making the headlight water and dust-proof. A meter hole is formed in the upper surface of a headlight case which constitutes a headlight, a speedometer is inserted into the meter hole from above and is secured to the headlight case through a meter stay in the interior of the headlight case. In addition, a meter cord and bulb cord are put together and extend between the exterior and the interior through a wiring hole formed in the rear portion of the headlight case.

10 Claims, 10 Drawing Sheets

SPEEDOMETER MOUNTING DEVICE FOR A VEHICLE

BACKGROUND OF THE INVENTION

1. Field of the Invention

The present invention relates to a speedometer mounting device for a vehicle for mounting a speedometer advantageously on an upper surface of a headlight case for a two-wheeled motor vehicle.

2. Description of Background Art

Japanese Utility Model Laid Open No. 119953/1974 discloses a two-wheeled motor vehicle with a speedometer mounted on an upper surface of a headlight. This speedometer is inserted into the interior of a headlight case through an opening formed in an upper surface of the headlight case and is supported by a stay provided in the interior of the headlight case. Further, a meter cable adapted to rotate synchronously with a front wheel is connected to the bottom of the speedometer.

Since the above conventional meter is a mechanical meter, it is necessary to provide a wiring hole for the meter cable which extends in the vertical direction substantially along the front forks. The wiring hole is formed in the lower surface of the headlight case. On the other hand, it is necessary that wiring for a headlight bulb extend in the longitudinal direction so as to be as short as possible. Therefore, a hole for the wiring is formed in a rear portion of the headlight case.

However, if such a wiring hole exclusive for the meter cable is formed separately from the wiring hole for the bulb, there arises the necessity of specially providing a means for preventing the entry of water and dust from below the headlight case. In addition, the headlight integral with the speedometer has a heavy weight of the light body plus an additional weight of the speedometer and therefore it is necessary to enhance the rigidity of the headlight case for supporting those components. The headlight case integral with the speedometer is required to have an opening in its upper surface for insertion therein of the speedometer. This opening causes a deterioration with regard to the rigidity of the case. Therefore, if a wiring hole exclusive for the meter cable must be formed in addition to the opening, the opening area increases and, results in the deterioration of the rigidity of the case and there arises the necessity of further enhancing the rigidity.

SUMMARY AND OBJECTS OF THE INVENTION

For solving the above-mentioned problems, the present invention provides a speedometer mounting device for a vehicle with a speedometer mounted on an upper surface of a headlight, wherein the speedometer is an electric meter, the electric meter includes a vehicle speed detecting means, a vehicle speed calculating means which calculates a vehicle speed in accordance with a detection signal provided from the vehicle speed detecting means and which outputs a vehicle speed signal, and a drive means which receives the vehicle speed signal and indicates the vehicle speed.

The present invention includes a speedometer mounting device for a vehicle wherein a pair of right and left front forks support a front wheel and are secured to a vehicle body frame through a top bridge and a bottom bridge. The headlight is provided in front of upper portions of the front forks, a trip meter of liquid crystal display is disposed within the speedometer, an indicator such as a blinker is disposed on the top bridge, and a reset switch for resetting the display on the trip meter is disposed in the vicinity of the top bridge.

According to the present invention, since an electric meter is provided as the speedometer, an electric wire is employable instead of the conventional meter cable. The wiring for the speedometer and the wiring for the headlight bulb can be positioned together and passed through the conventional wiring hole in the headlight case between the exterior and interior. Thus, it suffices to form a minimum opening, which is advantageous to the prevention of the entry of water and dust into the headlight case and also advantageous to ensuring the rigidity of the headlight case.

According to the present invention, since the indicator is disposed outside the speedometer, it becomes possible to attain a reduction in the size of the speedometer and there accrues an advantage not only with regard to ensuring the rigidity of the headlight case but also with regard to the entire design of the headlight. In addition, since the reset switch is disposed in proximity to the top bridge, it can be positioned closer to a rider and hence its operability is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention applied to a two-wheeled motor vehicle will be described hereinunder with reference to the drawings, in which first, an entire structure of a two-wheeled motor vehicle will be outlined with reference to FIGS. 2 to 5. This two-wheeled motor vehicle is characterized by a long wheel base, a low rider seat and a wide up-handle having grips which hang down.

A water-cooled V-engine 4 is supported by a vehicle body frame 3 which supports a front wheel 1 and a rear wheel 2 in front and in the rear, respectively. Above a front cylinder 5 and a rear cylinder 6 is disposed a tear-drop type fuel tank 7, and behind the fuel tank 7 a rider seat 8 and a fellow passenger seat 9 are disposed each independently in a front-rear relation.

The type of driving is a shaft drive type. A drive shaft 13 is passed through a hollow drive shaft arm 12 which is connected to a center frame 10 pivotably through a pivot shaft 11, the center frame 10 being a constituent of a vehicle body frame. A front end portion of the drive shaft 13 is driven by an output gear mechanism 15 disposed in the rear portion of the crank case 14. Rotation is transmitted to the rear wheel 2 from a final gear mechanism 17 disposed within a final gear case 16.

The upper portion side of a pair of right and left front forks 20 which support the front wheel 1 are inclined to the rear to form an enlarged angle. The front forks 20 are connected to a head pipe 23 pivotably through a steering stem 24 (FIG. 1), the head pipe 23 is mounted at the front end portion of the vehicle body frame 3 through a top bridge 21 and a bottom bridge 22. The front forks 20 are steered by a handle bar 26 which is supported centrally by handle clamps 25 provided on the top bridge 21.

The handle bar 26 is an up type bar which, when seen in a side view (FIG. 2), extends rearwardly while being curved in an upwardly convex shape. Grips 27, when seen in a side view, are positioned near a rear upper surface portion of a tank cap 28. When seen in a top view, as is apparent from FIG. 3, the handle bar 26 expands largely to the right and left and the positions of the grips 27 project outwardly with respect to rider steps 29. Thus, as a whole, the handle bar 26 is a wide up type shape which is largely curved upwardly. The rider steps 29 are plate-like and fixed to lower, front, right and left positions of the vehicle body frame 3.

Figure 1:
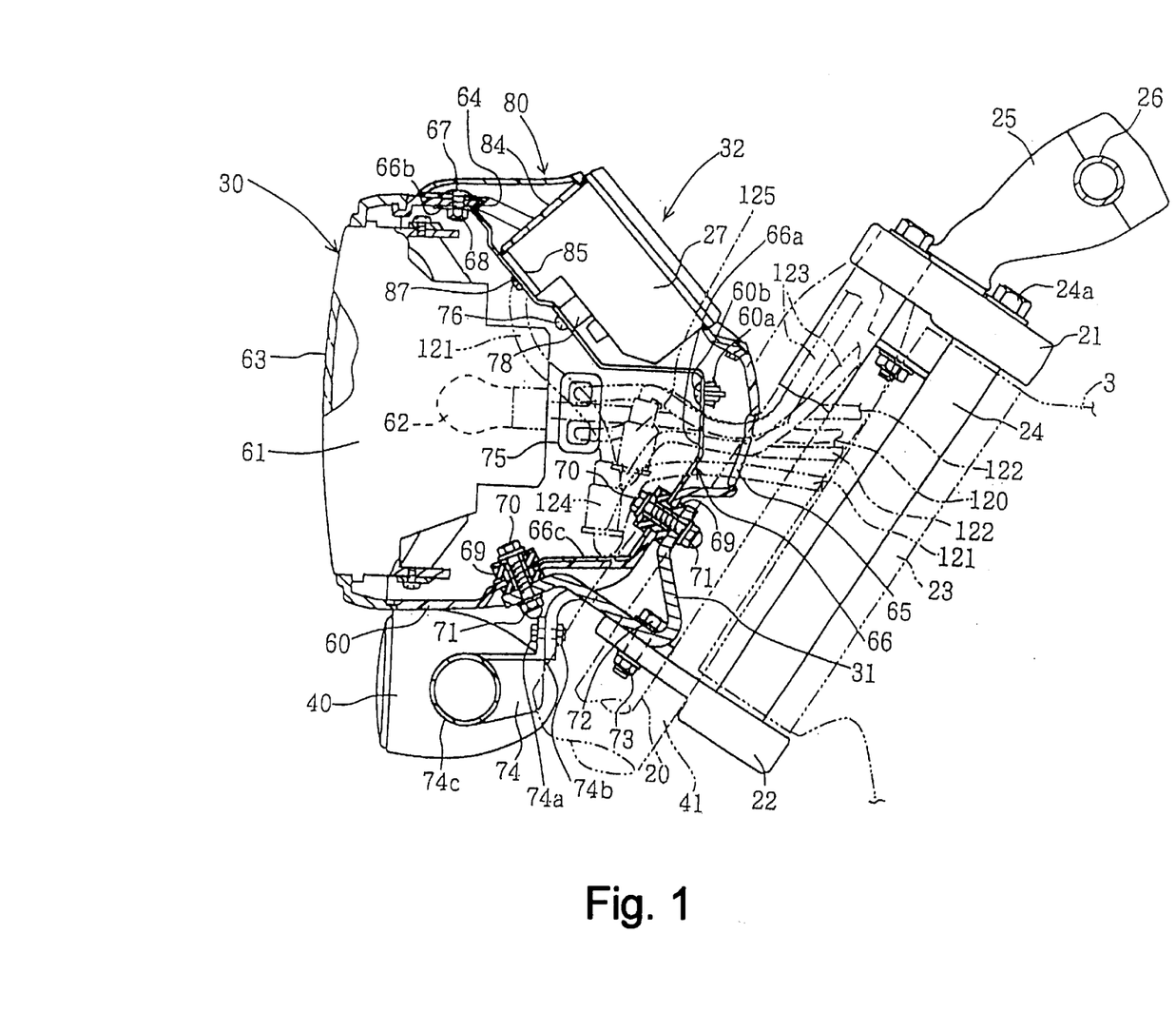
FIG. 1 is a sectional view of a headlight portion.

In front of the head pipe 23 is disposed a round headlight 30, which is secured to the bottom bridge 22 through a headlight stay 31 (FIG. 1). A speedometer 32 is integrally mounted to the upper surface of the headlight 30.

Figure 5:
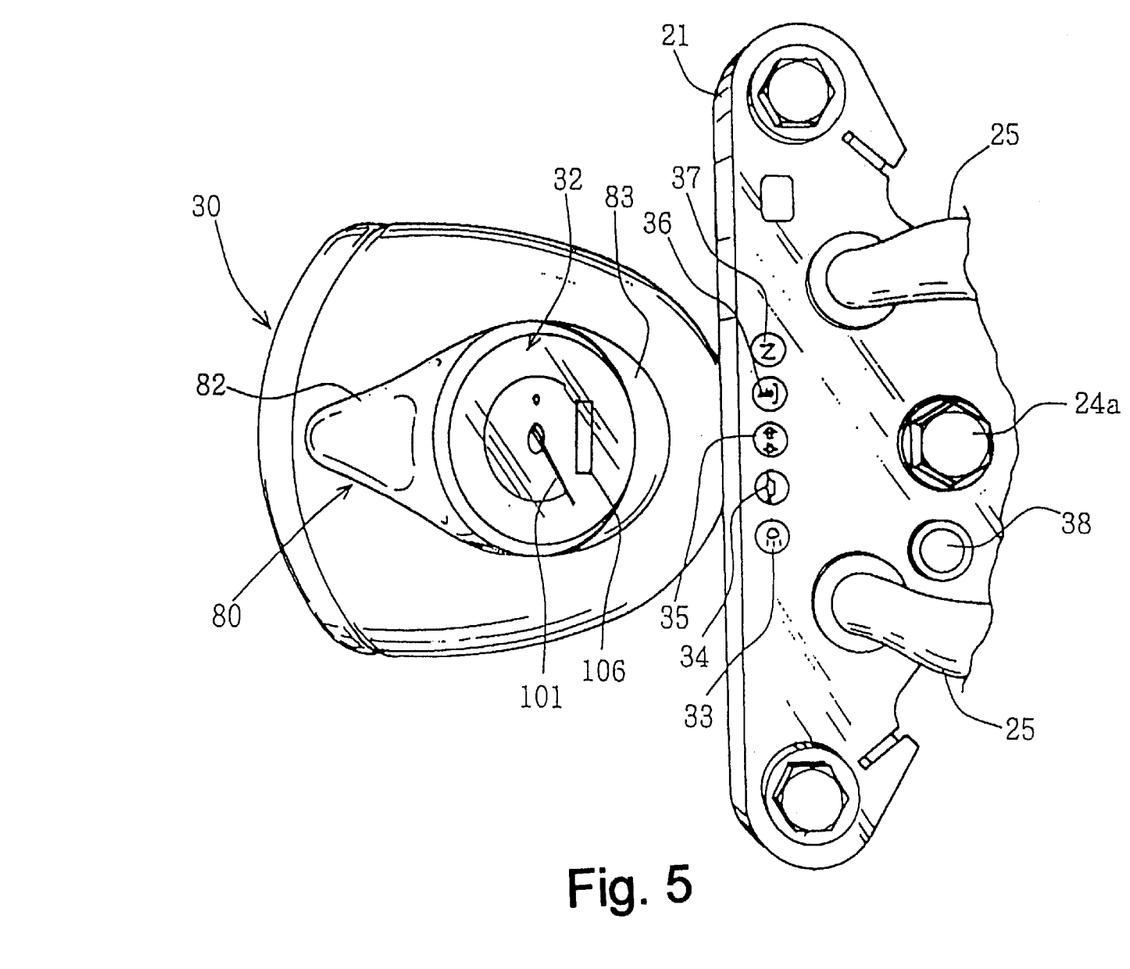
FIG. 5 is a top view of a top bridge portion and a speedometer portion.

As is seen from FIG. 5, various indicators and switches are disposed on the upper surface of the top bridge 21. An upper surface portion close to the front end of the top bridge 21 serves as an indictor mounting portion, in which are arranged laterally in a row a high-beam indicator 33, an oil indicator 34, a turn indicator 35, a water temperature indicator 36 and a neutral lamp 37. Further, a reset switch 38 to be described later is disposed at a position behind the indicators and neutral lamp and near a clamping nut 24*a* of the steering stem 24. FIG. 5 is somewhat different in top view angle from FIG. 3.

Figure 2:
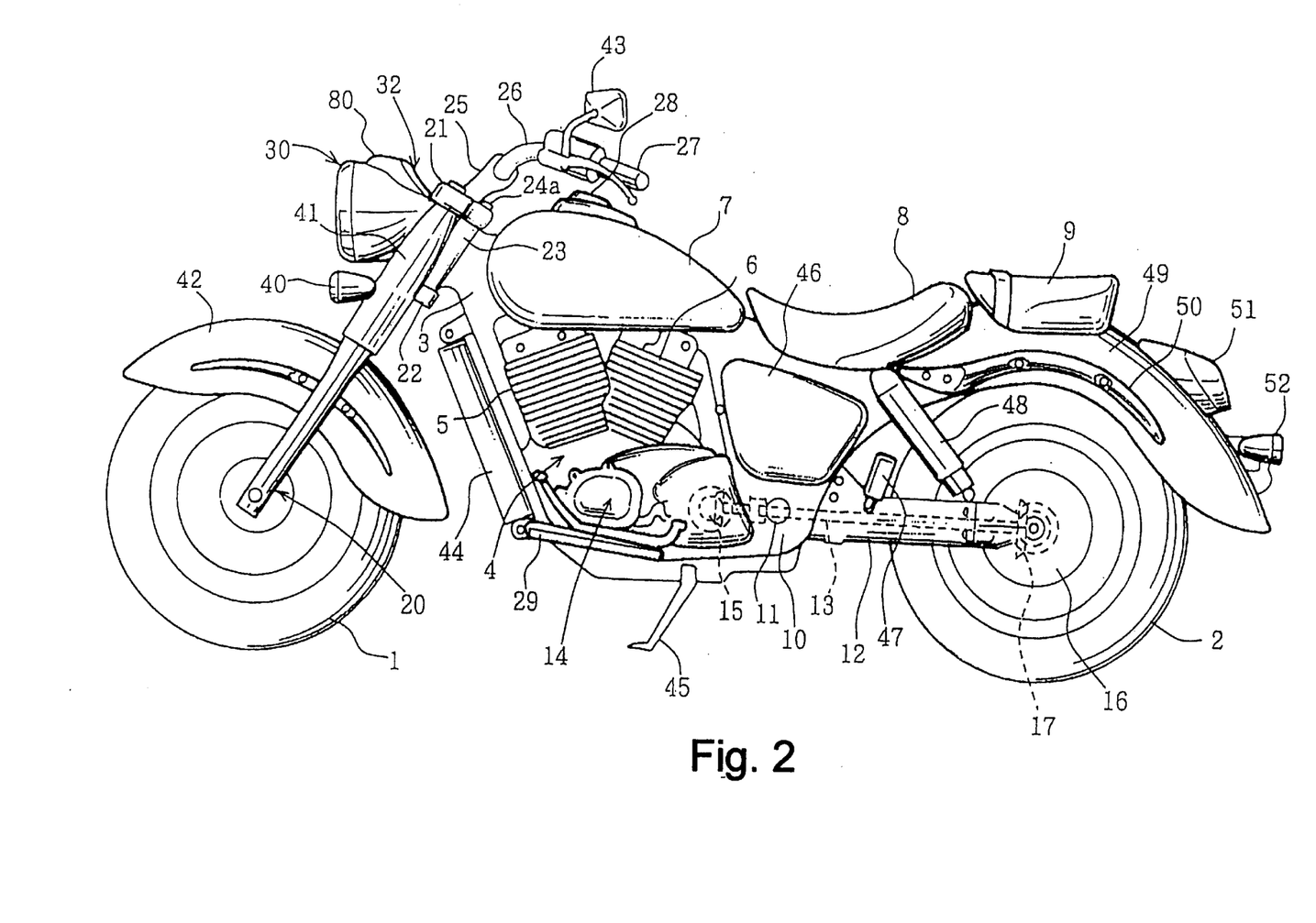
FIG. 2 is a side view of a two-wheeled motor vehicle to which the present invention is applied.
Figure 3:
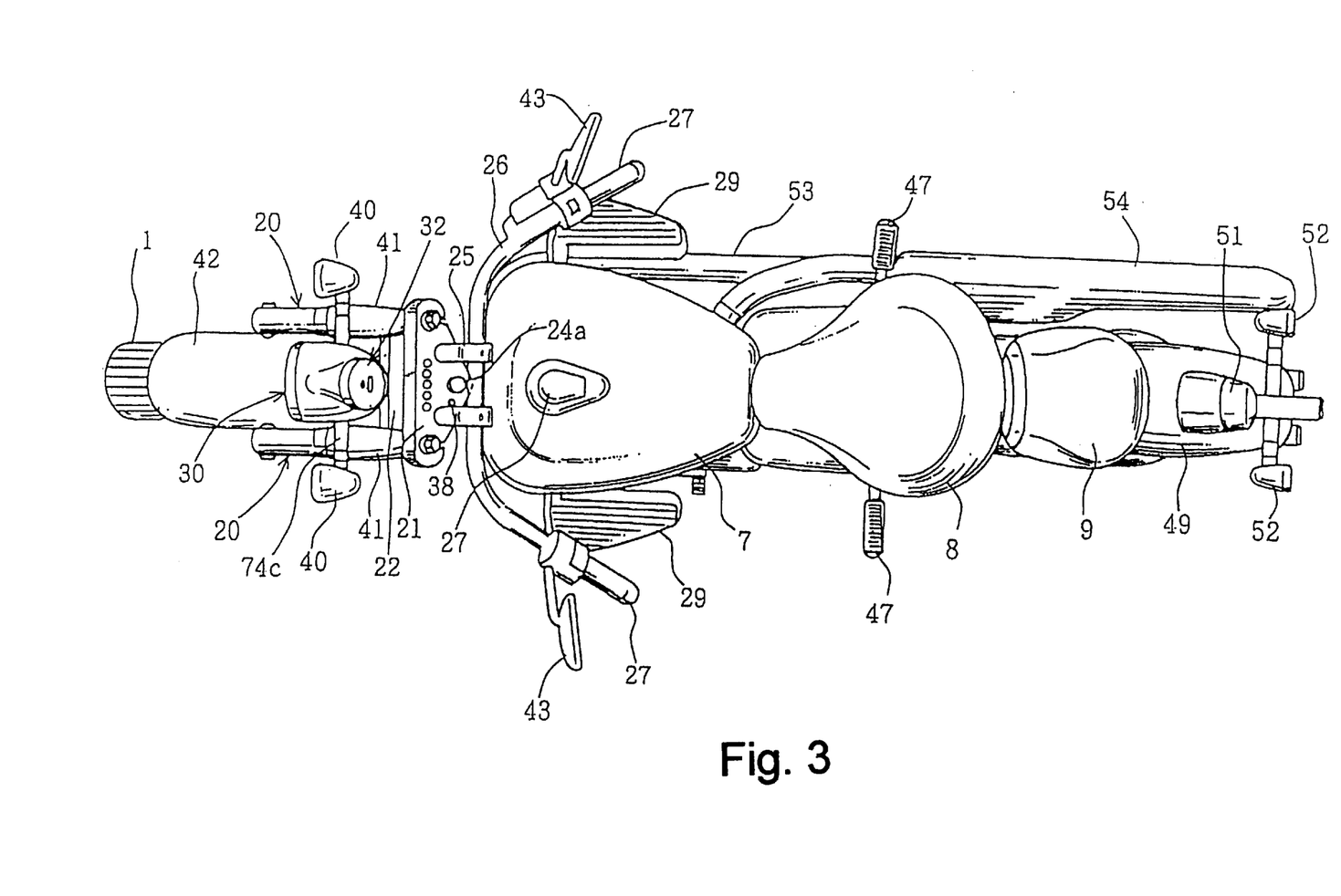
FIG. 3 is a top view thereof.
Figure 4:
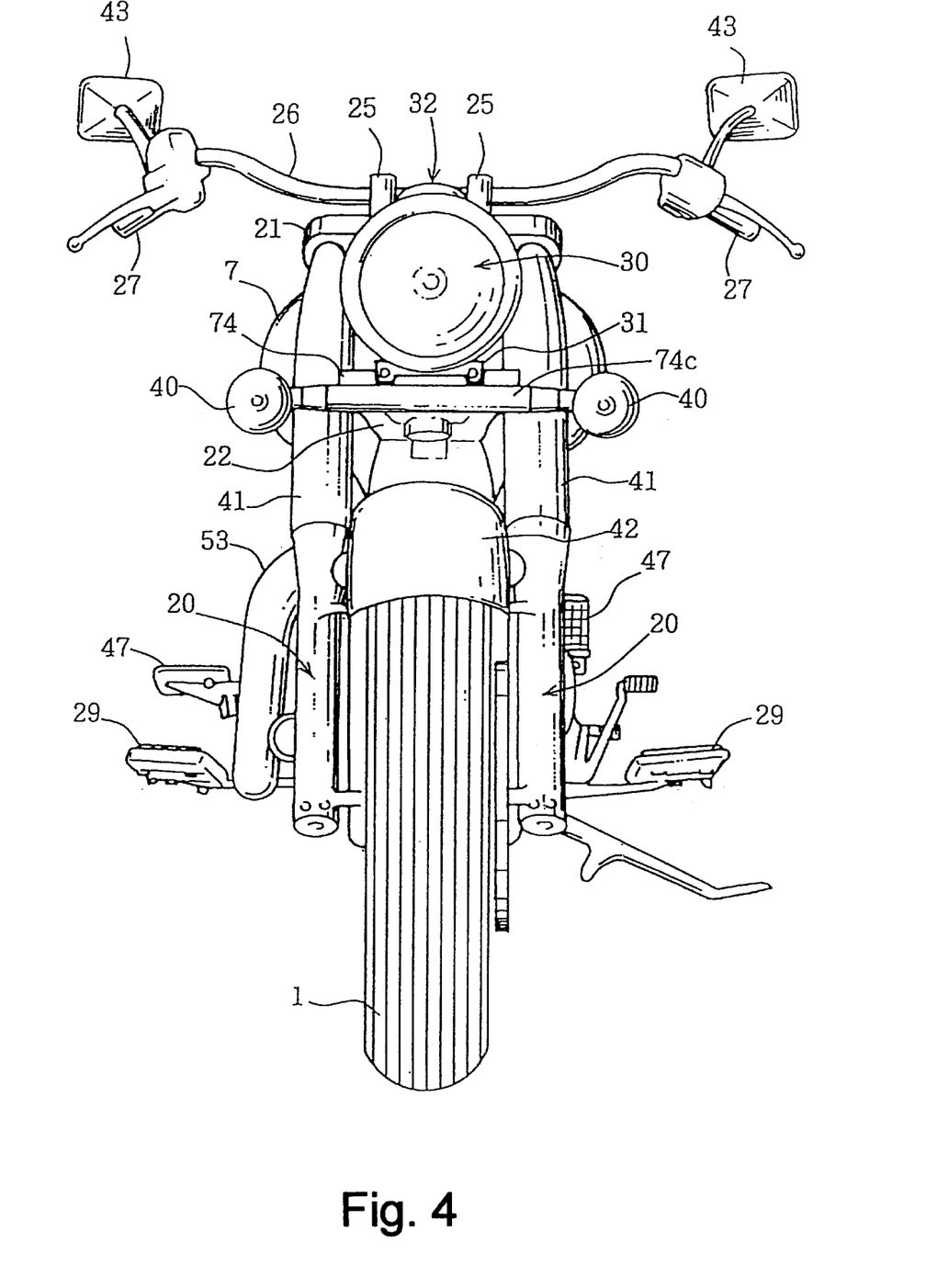
FIG. 4 is a front view thereof.

In FIGS. 2 to 4, a front blinker 40 is positioned adjacent to a fork cover 41 which covers the upper portion of each front fork 20. A front fender 42 is mounted relative to the fork cover 41. A rear view mirror 43 is mounted on the handle bar 26. A radiator 44 is mounted relative to the motorcycle frame. A side stand 45 is provided for supporting the motorcycle during non-use. A side cover 46 is mounted adjacent to a fellow passenger step 47 that is capable of being folded (in FIG. 4 the right-hand step is unfolded and the left-hand step is folded). A shock absorber 48 is mounted relative to the frame and the rear wheel 2. A rear fender 49 is supported on the motorcycle frame. A plated grab rail 50 is secured to the rear fender 49. A tail lamp 51 is positioned on a rear portion of the rear fender 49. The tail lamp 51 also serves as a stop lamp. A rear blinker 52 is positioned below the tail lamp 51. As illustrated in FIG. 3, an exhaust pipe 53 and a muffler 54 extend from front and rear cylinders, respectively.

Next, the headlight 30 and the speedometer 32 will be described in detail. As shown in FIG. 1, the headlight 30 comprises a headlight case 60 which is generally in the shape of a cannon ball having an open front portion and a light body 61 accommodated within the case 60, with a bulb 62 being removably attached to the light body 61.

The light body 61 has a reflector of a multi-reflector type constituted by a large number of curved surfaces, while a lens 63 which covers the front side is a clear glass lens of a substantially uniform curved surface as a whole without any special cut.

The headlight case 60 is formed by molding from a suitable material such as resin or the like and the surface thereof is plated. A meter mounting hole 64 (see FIG. 6) is formed in the upper surface of the case 60 and a wiring hole 65 is formed in the rear portion of the case. In the interior of the case 60 is disposed a meter stay 66 extending from the upper portion to the lower portion through the rear portion. An opening 66*a* is formed in a central portion of the meter stay 66 which portion overlaps the wiring hole 65.

Figure 6:
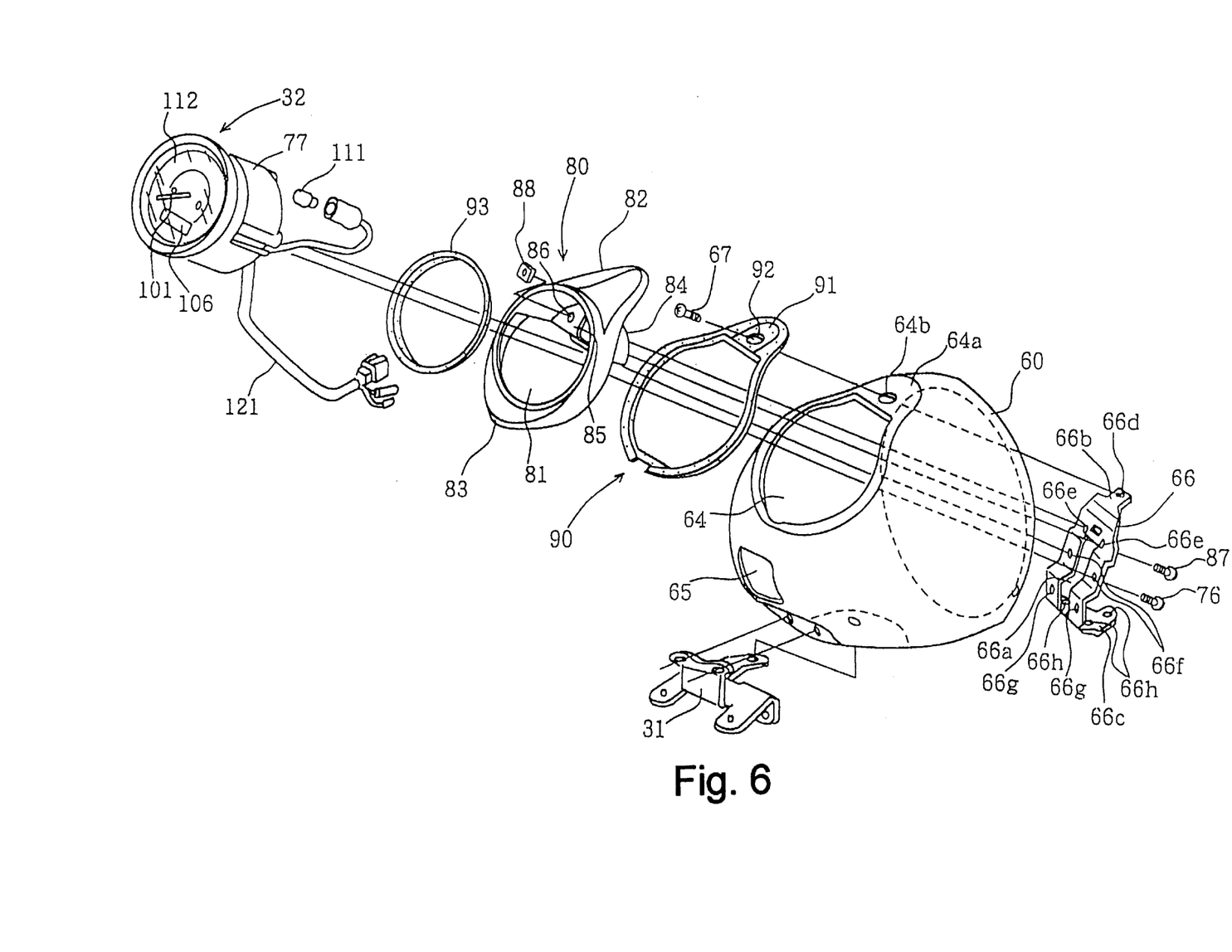
FIG. 6 is an exploded perspective view showing a speedometer mounting method.
Figure 7:
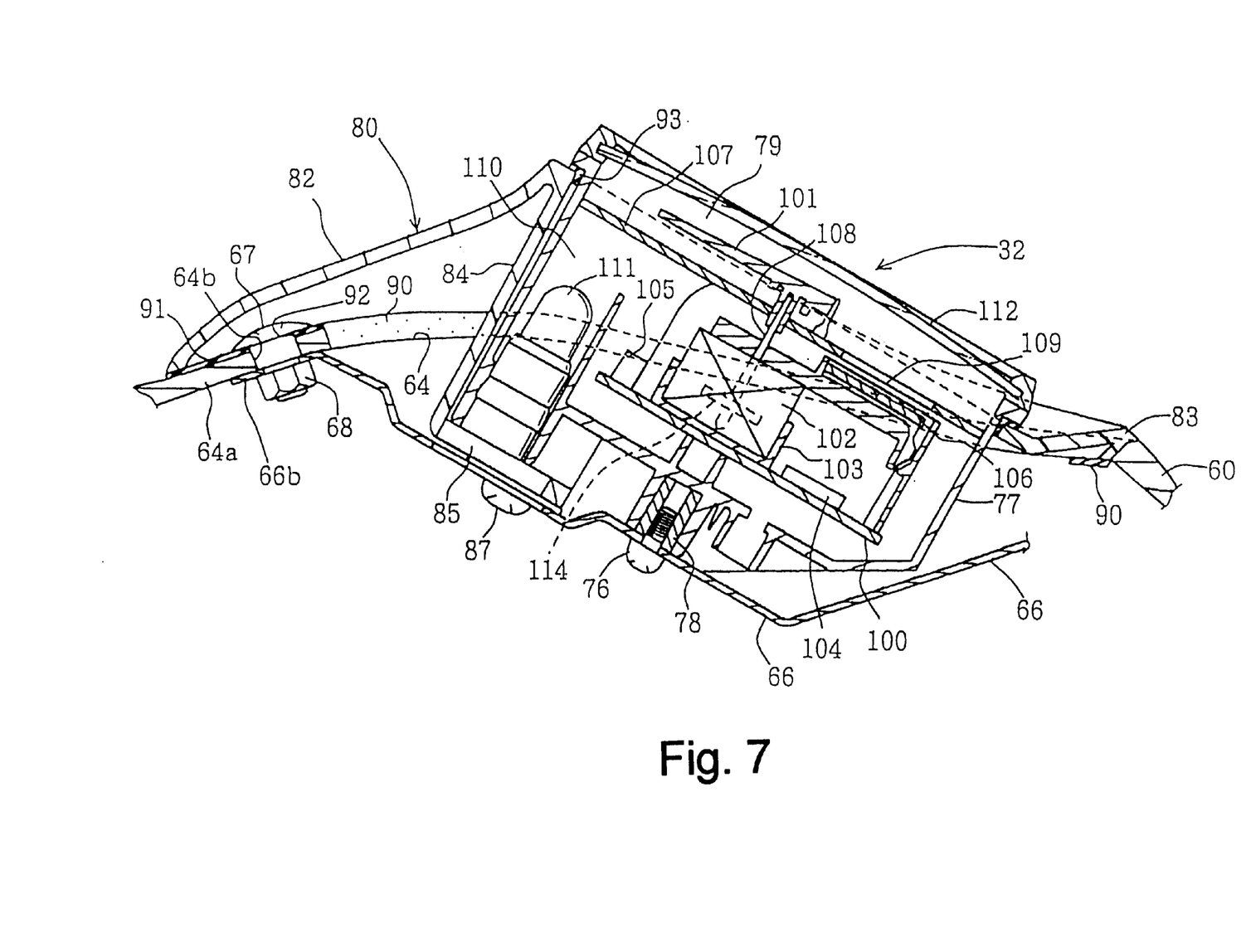
FIG. 7 is a sectional view of the speedometer portion.

As illustrated in FIGS. 6 and 7, the meter stay 66 is fixed at an upper end portion 66*b* thereof to the back of an upper front portion of the headlight case 60 located in front of the meter mounting hole 64 with the use of a machine screw 67 and a nut 68, an intermediate portion of the meter stay 66 is fixed with machine screws 60*b* to a boss 60*a* which is integral with the inner surface of the headlight case 60, and a lower portion 66*c* of the meter stay 66 is clamped at a total of three positions, which are one front position and two right and left rear positions.

More specifically, the lower portion 66*c* is clamped together with the lower portion of the headlight case 60 and the headlight stay 31 with bolts 70 and nuts 71 through a mounting rubber 69, whereby the headlight 30 is supported vibration proof wise with respect to the vehicle body.

The headlight stay 31 is secured to a bottom bridge 22 with a bolt 72 and a nut 73. As illustrated in FIG. 1, a stay 74 is provided for supporting the blinkers 40. The stay 74 is supported by clamping bolt 74*a* and nut 74*b* to the front end portion of the headlight stay 31. A cross pipe 74*c* is secured to the stay 74 and the blinkers 40 are supported respectively at both right and left ends of the cross pipe 74*c*.

In the interior of the headlight case 60 and at a rear position of the light body 61 is disposed a water temperature indicator unit 75. The water temperature indication unit 75 includes a breaking of a wire detecting function. In FIG. 1, the headlight 30 and the speedometer 32 are shown in a central section taken substantially along the center of the vehicle body, while the top bridge 21 and the bottom bridge 22 are shown in a non-sectional form.

As is apparent from FIG. 6, the speedometer 32 is inserted from above into the meter mounting hole 64, and within the headlight case 60, the bottom thereof is put on the meter stay 66. Then, from the inside of the headlight case 60, machine screws 76 are threadedly engaged with nut portions 78 (FIG. 7) formed in the bottom of a meter case 77 which constitutes the speedometer 32. In this way the speedometer 32 is fixed.

The meter mounting hole 64 is covered with a meter cover 80 except for a display portion 79 (FIG. 7) of the upper surface of the speedometer 32 and the vicinity thereof. The meter cover 80 is formed by molding from a suitable material such as resin and its surface is plated as is the case with the headlight case 60. Centrally of the meter cover 80 is formed a meter hole 81. In front of the meter hole 81 is formed a front projection 82 integrally which covers the machine screw 66, while in the rear of the meter hole is formed a rear projection 83 integrally which comes into fitting engagement with the rear portion of the meter mounting hole 64.

A downwardly projecting front wall portion 84 is formed integrally with the front side of the central meter hole 81 and its lower end portion constitutes a mounting bottom 85 which is superimposed on the meter stay 66. The mounting bottom 85 is fixed to the meter stay 66 with machine screws 87 and nuts 88 through a mounting hole 86 (FIG. 6) formed in the mounting bottom 85.

In the upper end portion 66*b* of the meter stay 66 is formed a through hole 66*d* for the machine screw 67. At right and left positions of the intermediate portion of the meter stay 66 are formed, successively from above, a pair of through holes 66*e* for the machine screws 87, a pair of through holes 66*f* for the machine screws 76 and a pair of through holes 66*g* for the machine screws 60*b* (FIG. 1). Also in the lower portion 66*c* of the meter stay 66 are formed three through holes 66*h* for the rubber mounting 69 (FIG. 1).

Between the meter cover 66 and the headlight case 60 around the meter mounting hole 64 is interposed a rubber seal 90 for the meter mounting hole. The rubber seal 90 is in a generally tumbler shape, which is almost the same as the shape of the meter mounting hole 64, provided on the front side thereof is formed a fixing portion 91 and a through hole 92 is formed centrally thereof.

The fixing portion 91 is superimposed on the mounting portion 64*a* of the headlight case formed in front of the meter mounting hole 64, whereupon the through hole 64*b* formed in the mounting portion 64*a* and the through hole 92 formed in the fixing portion 91 are aligned with each other. Through these through holes the fixing portion 91 and the mounting portion 64*a* are clamped together with the machine screw 67 and the nut 68. Also between the meter cover 80 and the speedometer 32 is disposed a circular rubber seal 93 for the meter.

As is seen in FIG. 7, the speedometer 32 is an electric meter whose detailed structure will be described later. Within the meter case 77 is disposed a circuit board 100. On the upper surface of the circuit board 100, a bobbin 103 for a cross coil 102 which drives a pointer 101, a CPU 104 serving as both a vehicle speed calculating means and a drive control means, and a drive transistor 105 for the cross coil 102, are connected together electrically.

Above the CPU 104 is disposed a liquid crystal display 106 serving as display portions of both the odometer and the trip meter. The odometer indicates the total running distance of the vehicle cumulatively, while the trip meter indicates a sectional running distance starting from a reset point, for example, when the vehicle is supplied with fuel.

The interior of the meter case 77 above the liquid crystal display 106 is partitioned by a display board 107, and a pointer shaft 108 extends upwardly from the cross coil 102 through the central part of the display board 107, with the pointer 101 being fixed to the tip of the pointer shaft 108. In the display board 107 is formed a window hole 109 at a position above the liquid crystal display 106 so that the rider can see the contents of liquid crystal display from the exterior.

Such an indication as a scale formed on the surface of the display board 107 is illuminated in a light transmitting manner by a back light bulb 111 which is disposed within a small compartment 110 in the meter case 77. A transparent cover 112 is mounted thereon. The sectional portion of the meter stay 66 in FIG. 7 extends through the clamping portion using the machine screws 76, unlike that in FIG. 1.

Figure 8:
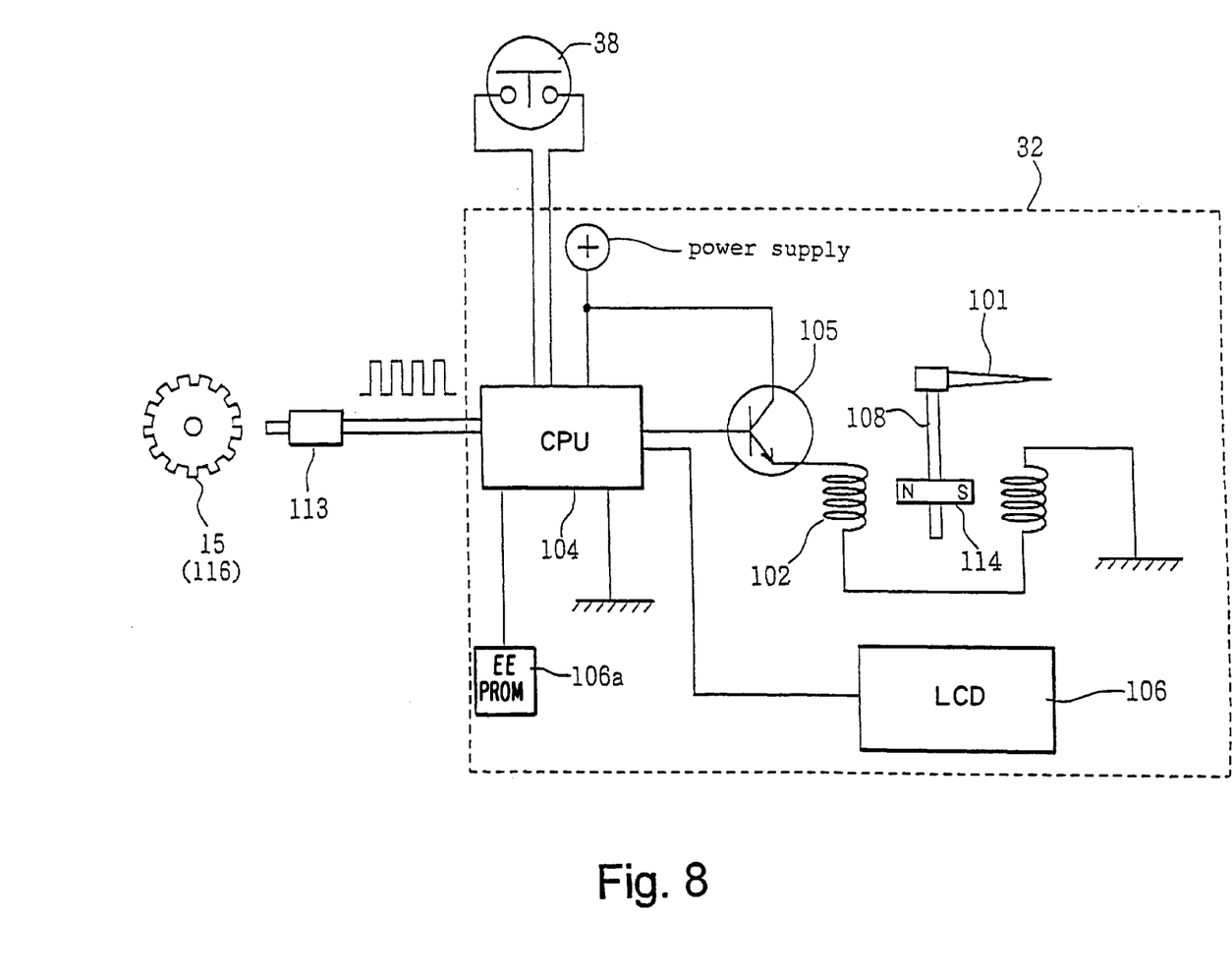
FIG. 8 is a circuit diagram of the speedometer.

As is apparent from FIG. 8, a hall device 113 which constitutes a vehicle speed detecting means together with the output gear mechanism 15 is connected to the CPU 104. The hall device 113 is positioned near a constituent gear (an output driven gear 116 in this embodiment which will be described later) of the output gear mechanism 15. At every passage of a tooth of the said constituent gear the hall device 113 outputs a pulse and detects the vehicle speed thereby.

In accordance with a detection signal provided from the hall device 113 the CPU 104 calculates the vehicle speed and at the same time integrates the running distance, then prepares distance information pieces for the odometer and the trip meter, stores them in an EEPROM 106*a* and allows them to be displayed on the liquid crystal display 106. The distance information pieces stored in the EEPROM 106*a* are retained even if the vehicular power supply is turned OFF.

Further, the CPU 104 inputs a vehicle speed signal based on the above vehicle speed calculation to the base of the drive transistor 105, thereby causing the base current in the drive transistor 105 to be changed according to the vehicle speed, and controls the magnetic field of the cross coil 102 to which the base current is output.

In an inside space surrounded with the cross coil 102 is positioned a magnet 114 which is integral with the lower end portion of the pointer shaft 108, and rotates according to changes in magnetic field caused by changes in excitation of the cross coil 102, so that the pointer shaft 108 integral with the magnet 114 and the pointer 101 turns at only an angle proportional to the vehicle speed and consequently the vehicle speed can be recognized by the scale on the display board 107.

Further, the CPU 104 can reset the indication of the running distance on the trip meter. When the reset switch 38 connected to the CPU 104 is closed, a reset signal is inputted to the CPU 104, which in turn resets the indication of the trip meter on the liquid crystal display 106.

Figure 9:
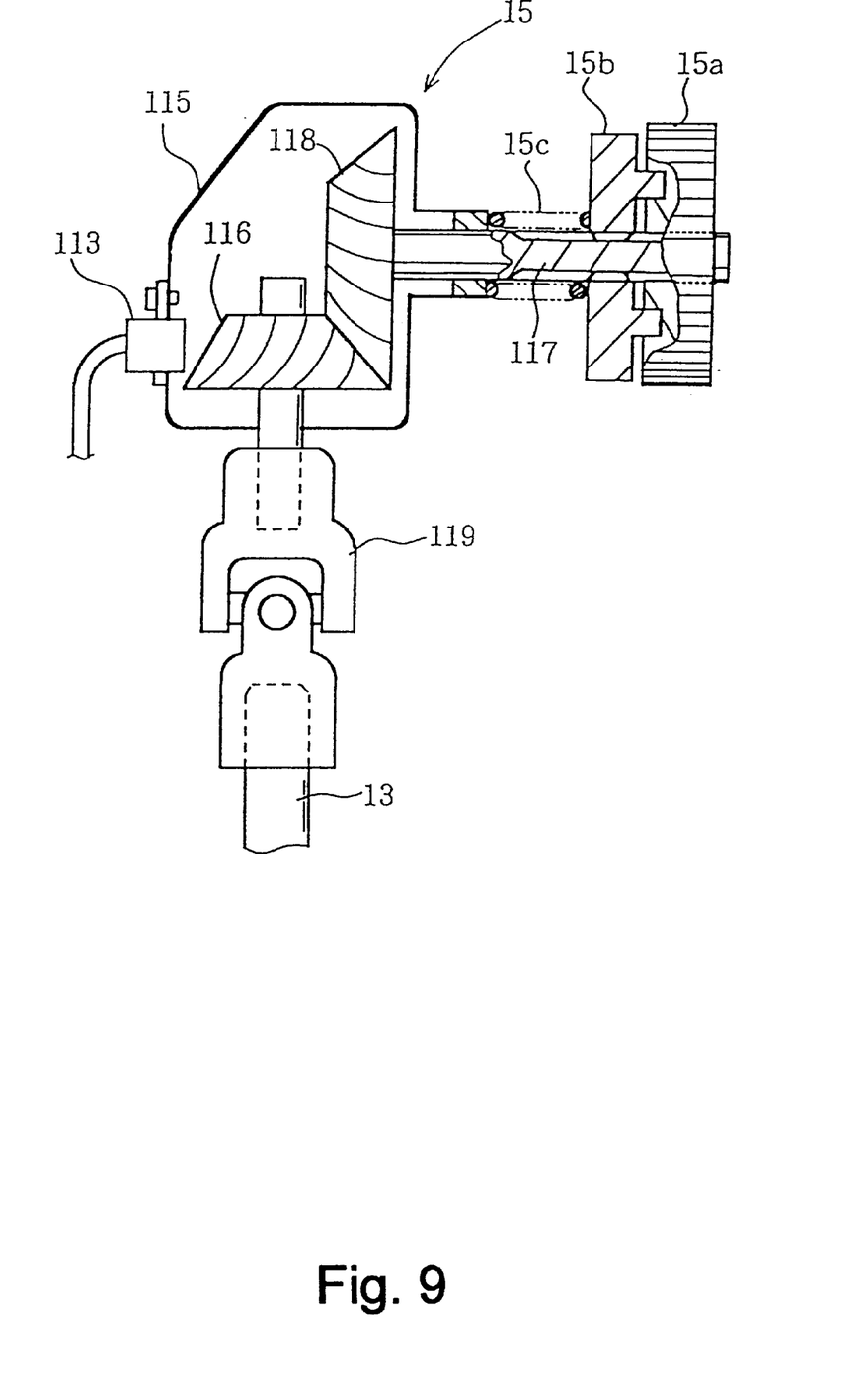
FIG. 9 is a sectional view showing a vehicle speed detecting portion.

As shown in FIG. 9, the hall device 113 is mounted to a gear box 115 of the output gear mechanism 15 and is located near the output driven gear 116. The output gear mechanism 15 comprises an output drive gear 118 of bevel teeth mounted on an output shaft 117 of an engine and an output driven gear 116 also of bevel teeth meshing with the drive gear 118. The output driven gear 116 rotates in synchronism with the output shaft 117 and it is connected to the front end portion of the drive shaft 13 through a universal joint 119.

In FIG. 9, an output gear 15*a* is supported for free rotation on the output shaft 117 of a transmission (not shown). A damper cam 15*b* is mounted on the output shaft 117 and is positioned adjacent to a damper spring 15*c*. The output of the transmission is transmitted to the output drive gear 118 through the output gear 15*a*, damper cam 15*b* and output shaft 117 and is further transmitted from the output driven gear 116 to the drive shaft 13.

Figure 10:
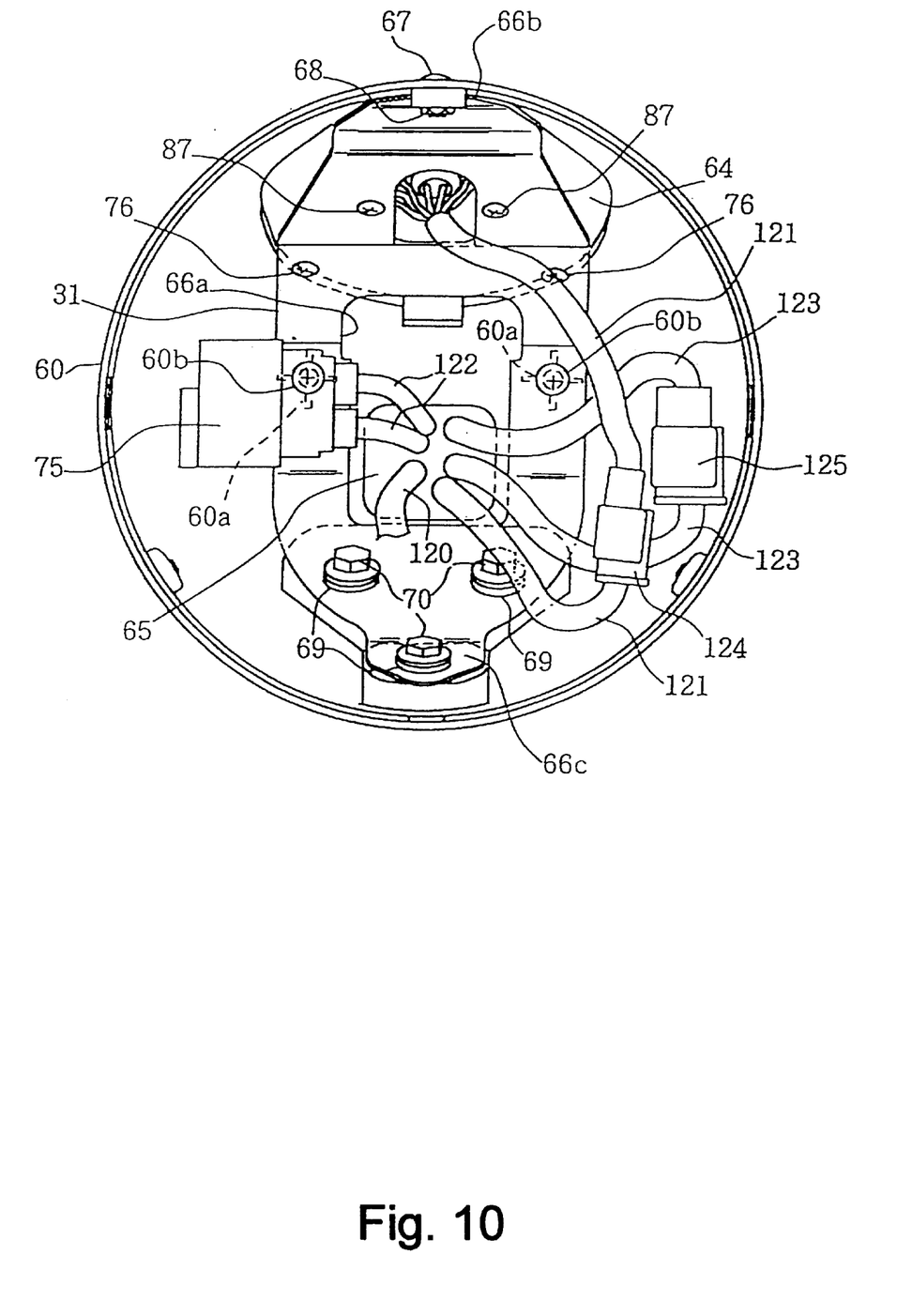
FIG. 10 is a diagram showing a wiring structure in the interior of the headlight.

As shown in FIGS. 1 and 10, an electric wiring in the headlight case 60 comprises a bulb cord 120 connected to the light body 61, a meter cord 121 connected to the speedometer 32, water temperature indicator unit cords 122 connected to the water temperature indicator unit 75, and other indicator cords 123. These cords are put together and extend into the interior from the exterior through the wiring hole 65. Couplers 124 and 125 are mounted on the cords 121 and 123.

The operation of this embodiment will now be described. Since an electric meter is provided as the speedometer 32, the meter cord 121, which is an electric wire, can be used instead of the conventional meter cable. Therefore, the meter cord 121 can be passed together with the bulb cord 120 between the exterior and the interior through the wiring hole 65 which has heretofore been formed in the headlight case. Thus, the opening in the headlight case can be minimized and this is advantageous for ensuring the rigidity of the headlight case 60. Besides, since the opening is minimized and there is no opening on the lower side of the headlight case 60, there accrues an advantage in preventing the entry of water and dust into the headlight case 60.

Further, since the indicators (33 to 37) and the reset switch 38 can be disposed outside the speedometer 32, it is possible to reduce the size of the speedometer 32 and an advantage accrues not only in ensuring the rigidity of the headlight case 60 but also with regard to designing the whole of the headlight 30. Particularly, unlike a mechanical speedometer, the reset switch 38 used in this electric speedometer can be disposed at any position outside the speedometer 32, so that by disposing the reset switch 38 on the top bridge 21 at a position near the rider, it can be drawn closer to the rider. As a result, the operability of the switch is improved.

The present invention is not limited to the above embodiment, but various modifications may be made. For example, the indication of speed in the electric speedometer may be made by a liquid crystal display, not with such a pointer as in the above embodiment. Of course, as the vehicle speed calculating means, the CPU may be substituted by a known electric circuit, and the vehicle speed detecting means is not limited to a hall device, but there may be used any of various known ones, e.g. a purser coil. Further, the vehicle to which the present invention is applied is not limited to the two-wheeled motor vehicle, but the invention is applicable to various vehicles each provided with a headlight and a speedometer such as a three or four-wheeled buggy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speedometer mounting device for a vehicle comprising:

a headlight case having a front opening and an opening in an upper surface and an input opening;

a headlight operatively mounted within said front opening of said headlight case;

a speedometer mounted in said opening in said upper surface of the headlight case, said speedometer being an electric meter, said electric meter having a vehicle speed detecting means, a vehicle speed calculating means for calculating a vehicle speed in accordance with a detection signal provided from said vehicle speed detecting means and for outputting a vehicle speed signal, and a drive means for receiving said vehicle speed signal and indicating the vehicle speed; and an input for illuminating said headlight and an input for actuating said speedometer being both supplied through said input opening.

2. The speedometer mounting device for a vehicle according to claim 1, wherein said headlight case includes a liquid crystal display trip meter disposed within said speedometer, and a reset switch for resetting the display on the trip meter.

3. The speedometer mounting device for a vehicle according to claim 1, and further including a meter stay operatively secured to said headlight case and to said speedometer for mounting said speedometer relative to said headlight case.

4. The speedometer mounting device for a vehicle according to claim 3, and further including an opening positioned on said upper surface of said headlight case for mounting said speedometer, and a seal positioned between said opening and said speedometer for providing a water tight connection therebetween.

5. The speedometer mounting device for a vehicle according to claim 4, and further including a meter cover positioned to surround said speedometer and being mounted adjacent to said opening and said seal, said meter cover including a front projecting portion and a rear projecting portion for overlapping a front and rear portion of said opening.

6. The speedometer mounting device for a vehicle according to claim 5, wherein said meter cover includes a front wall member extending from a bottom surface thereof, said front wall member having an integrally formed mounting bottom which extends substantially perpendicular therefrom, wherein said front wall member having said integrally formed mounting bottom has a hole disposed therethrough.

7. The speedometer mounting device for a vehicle according to claim 1, wherein said vehicle speed detecting means is a hall device, said hall device being operatively connected to an output gear mechanism for detecting the vehicle speed.

8. The speedometer mounting device for a vehicle according to claim 1, wherein said speedometer includes a reset switch for resetting a liquid crystal display trip meter disposed within said speedometer, said reset switch being operatively connected to said trip meter and positioned at a location other than concurrent with said speedometer.

9. The speedometer mounting device for a vehicle according to claim 8, and further comprising a top bridge member positioned aft of said headlight case and attached to a frame portion of the vehicle, wherein said reset switch is attached to a surface of said top bridge member.

10. The speedometer mounting device for a vehicle according to claim 1, and further comprising a meter cover having a bottom surface with a hole disposed therethrough and a meter stay having a hole disposed therethrough and operatively secured to said meter cover and said speedometer, wherein said input for illuminating said headlight and said input for actuating said speedometer are further supplied though said hole disposed though said bottom surface and said hole disposed though said meter stay.

* * * * *